(12) United States Patent
Matsuyama (10) Patent No.: US 9,121,300 B2
(45) Date of Patent: Sep. 1, 2015

(54) TURBOCHARGER

(75) Inventor: Yoshimitsu Matsuyama, Yokohama (JP)

(73) Assignee: IHI CORPORATION (JP)

( * ) Notice: Subject to any disclaimer, the term of this patent is extended or adjusted under 35 U.S.C. 154(b) by 607 days.

(21) Appl. No.: 13/513,253

(22) PCT Filed: Dec. 17, 2009

(86) PCT No.: PCT/JP2009/006971
§ 371 (c)(1),
(2), (4) Date: Jun. 1, 2012

(87) PCT Pub. No.: WO2011/074039
PCT Pub. Date: Jun. 23, 2011

(65) Prior Publication Data
US 2012/0237343 A1    Sep. 20, 2012

(51) Int. Cl.
F01D 17/14 (2006.01)
F01D 17/16 (2006.01)
F02B 37/24 (2006.01)
(Continued)

(52) U.S. Cl.
CPC .............. *F01D 17/165* (2013.01); *F02B 37/24* (2013.01); *F02C 6/12* (2013.01); *F02C 7/28* (2013.01); *F02M 59/06* (2013.01); *F05D 2230/642* (2013.01); *F05D 2240/55* (2013.01); *Y02T 10/144* (2013.01)

(58) Field of Classification Search
CPC ....... F01D 17/14; F01D 17/148; F01D 17/16; F01D 17/165; F02C 6/12; F02C 7/28; F04D 29/08; F04D 29/083; F05D 2240/55

USPC .......... 415/160, 163, 164, 206, 229, 230, 231
See application file for complete search history.

(56) References Cited

U.S. PATENT DOCUMENTS 5,087,176 A * 2/1992 Wieland ......................... 417/407
7,189,058 B2 * 3/2007 Metz et al. ..................... 415/165
(Continued)

FOREIGN PATENT DOCUMENTS

CN          101012772 A      8/2007
CN          101198769        6/2008
(Continued)

OTHER PUBLICATIONS

Chinese Office Action mailed on Oct. 25, 2013 for corresponding Chinese Application No. 200980162916.4 (with English translation).
(Continued)

*Primary Examiner* — Edward Look
*Assistant Examiner* — Christopher R Legendre
(74) *Attorney, Agent, or Firm* — Ostrolenk Faber LLP (57) ABSTRACT

A variable geometry turbocharger includes a bearing housing rotatably supporting a turbine impeller; and an exhaust nozzle changing the flow rate of an exhaust gas supplied to the turbine impeller, wherein the exhaust nozzle has an exhaust inlet wall disposed at the bearing housing side, the turbocharger has a seal member exhibiting a ring shape and sealing a gap formed between the bearing housing and the exhaust inlet wall, and an inner circumferential edge of the seal member firmly contacts the bearing housing and an outer circumferential edge of the seal member firmly contacts the exhaust inlet wall.

8 Claims, 4 Drawing Sheets

(51) Int. Cl.
  *F02C 6/12* (2006.01)
  *F02C 7/28* (2006.01)
  *F02M 59/06* (2006.01)

(56) References Cited

U.S. PATENT DOCUMENTS

| | | | |
|---|---|---|---|
| 7,322,791 B2 * | 1/2008 | Stilgenbauer | 415/164 |
| 7,351,042 B2 * | 4/2008 | Jinnai et al. | 417/407 |
| 7,509,804 B2 * | 3/2009 | Kobayashi | 60/602 |
| 7,559,199 B2 * | 7/2009 | Sausse et al. | 60/602 |
| 7,600,969 B2 * | 10/2009 | Frankenstein et al. | 415/177 |
| 2008/0304957 A1 * | 12/2008 | Walter et al. | 415/159 |
| 2009/0060737 A1 | 3/2009 | Frankenstein et al. | 415/229 |
| 2009/0246005 A1 * | 10/2009 | Eble et al. | 415/170.1 |
| 2010/0232937 A1 * | 9/2010 | Wengert et al. | 415/160 |
| 2011/0038742 A1 | 2/2011 | Fleig et al. | 417/406 |
| 2012/0237343 A1 * | 9/2012 | Matsuyama | 415/182.1 |
| 2015/0056067 A1 * | 2/2015 | Segawa | 415/167 |

FOREIGN PATENT DOCUMENTS

| | | |
|---|---|---|
| CN | 101517201 A | 8/2009 |
| DE | 102009004737 A1 | 7/2009 |
| EP | 1672177 A1 | 6/2006 |
| EP | 2143910 A1 * | 1/2010 |
| JP | 61-85503 | 5/1986 |
| JP | A-09-112697 | 5/1997 |
| JP | 2004-132363 | 4/2004 |
| JP | 2005-042588 | 2/2005 |
| JP | 2005-163783 | 6/2005 |
| JP | 2006-125588 | 5/2006 |
| JP | 2006-220053 | 8/2006 |
| JP | 2007-187015 | 7/2007 |
| JP | 2009-062840 | 3/2009 |
| JP | 2010190092 A * | 9/2010 |
| WO | WO 2006/133793 | 12/2006 |
| WO | WO 2007/104535 | 9/2007 |
| WO | WO 2009022448 A1 * | 2/2009 |

OTHER PUBLICATIONS

Extended European Search Report dated Apr. 16, 2013 issued in Corresponding European Patent Application No. 09852237.8.
Japanese Office Action, dated May 22, 2012, issued in corresponding Japanese Application No. 2008-268384. English translation included. Total 4 pages.
International Search Report and Written Opinion mailed Jan. 19, 2010 in corresponding PCT International Application No. PCT/JP2009/006971.
Notice of Allowance dated Jan. 22, 2013 issued in corresponding Japanese Application No. 2008-268384 with English translation.

* cited by examiner

TURBOCHARGER

CROSS-REFERENCE TO RELATED APPLICATIONS

The present application is a 35 U.S.C. §§371 national phase conversion of PCT/JP2009/006971, filed Dec. 17, 2009, the content of which is incorporated herein by reference. The PCT International Application was published in the Japanese language.

TECHNICAL FIELD

The present invention relates to a turbocharger that supercharges air which is supplied to an engine using the energy of exhaust gas discharged from the engine, and specifically to a variable geometry turbocharger.

BACKGROUND ART

Conventionally, the variable geometry turbocharger is known which can improve the performance of the engine over a wide range from a low revolution region to a high revolution region.

Here, a variable geometry turbocharger is disclosed in Patent Document 1.

The above described turbocharger has a configuration in which a turbine housing and a compressor housing are integrally connected via a bearing housing, and a turbine impeller disposed inside the turbine housing and a compressor impeller disposed inside the compressor housing are connected by a rotating shaft that is disposed so as to be rotatable inside the bearing housing.

An exhaust gas inlet port is disposed at the turbine housing, and the exhaust gas that flows in from the inlet port is introduced in a turbine scroll flow path inside the turbine housing. A variable nozzle unit (an exhaust nozzle) is disposed at the turbine housing side of the bearing housing, wherein the variable nozzle unit guides the exhaust gas introduced in the turbine scroll flow path to the turbine impeller and can change the flow rate thereof.

The variable nozzle unit includes a shroud ring that is an exhaust inlet wall of the turbine housing side and a nozzle ring that is an exhaust inlet wall of the bearing housing side. The nozzle ring and the shroud ring are connected with a predetermined gap. A plurality of nozzle vanes is disposed annularly between the nozzle ring and the shroud ring in order to adjust the flow rate of the exhaust gas.

A predetermined gap is provided between the shroud ring of the variable nozzle unit and the turbine housing. Although the gap is not required intrinsically, since thermal deformation occurs between when the turbine housing is cooled and when the turbine housing is heated, their positional relationship relative to the shroud ring change. Therefore, the gap is provided.

However, the exhaust gas inside the turbine scroll flow path leaks to an outlet side of the turbine housing through the gap and turbine efficiency of the turbocharger is decreased. A C-ring for sealing is disposed between substantially cylindrical outer circumferential surface of an extension section that is extended from an inner circumferential edge of the shroud ring to the turbine housing and an inner circumferential surface of the turbine housing facing the outer circumferential surface of the extension section to block the gap. The C-ring is formed of an elastic body and can follow the thermal deformation of the turbine housing due to the elastic force thereof.

CITATION LIST

Patent Document

[Patent Document 1]
Japanese Unexamined Patent Application, First Publication No. 2006-125588 (page 14 and FIG. 1)

SUMMARY OF INVENTION

Technical Problem

Meanwhile, in order to compensate for the change of the relative position with respect to the nozzle ring due to the thermal deformation of the turbine housing, a predetermined gap is also provided between the turbine housing and the nozzle ring of the variable nozzle unit.

Since the gap communicates with the turbine scroll flow path, the exhaust gas is introduced in the gap and passes through a gap between the nozzle ring and the bearing housing so that the exhaust gas leaks to the location of the turbine impeller.

Here, a seal plate that is a ring-shaped plate is disposed between the nozzle ring and the bearing housing. First of all, since the seal plate does not have a function of actively sealing the gap between the nozzle ring and the bearing housing, the exhaust gas leaks from the gap, the flow of the exhaust gas which is introduced into the location of the turbine impeller through the variable nozzle unit is disrupted. As a result, there is a possibility where the turbine efficiency of the turbocharger is decreased.

The invention is accomplished considering the above described situation, and an object of the invention is to provide a turbocharger where exhaust gas can be prevented from leaking from a gap between a nozzle ring and a bearing housing, and turbine efficiency can be improved.

Solution to Problem

In order to solve the above described circumstances, the invention employs the devices described below.

A turbocharger of a first aspect of the invention employs a configuration in which a variable geometry turbocharger includes a bearing housing rotatably supporting a turbine impeller, and an exhaust nozzle that can change the flow rate of an exhaust gas supplied to the turbine impeller, wherein the exhaust nozzle has an exhaust inlet wall disposed at the bearing housing side, the turbocharger has a seal member exhibiting a ring shape and sealing a gap formed between the bearing housing and the exhaust inlet wall, and an inner circumferential edge of the seal member firmly contacts the bearing housing and an outer circumferential edge of the seal member firmly contacts the exhaust inlet wall.

In the first aspect of the invention employing the above described configuration, since the inner circumferential edge and the outer circumferential edge of the ring-shaped seal member firmly contact the bearing housing and the exhaust inlet wall respectively. Accordingly, the gap between the bearing housing and the exhaust inlet wall is shielded and the exhaust gas can be prevented from leaking from the gap. Accordingly, the flow of the exhaust gas introduced into the location of the turbine impeller through the variable nozzle unit is not disturbed and can be kept in a uniform state.

In addition, the turbocharger of a second aspect of the invention employs a configuration wherein the seal member is a disc spring.

In the second aspect of the invention employing the above described configuration, since the disc spring has the elastic force, an inner circumferential edge and an outer circumferential edge of the disc spring can firmly contact the bearing housing and the exhaust inlet wall respectively. In addition, in the second aspect of the invention, even though the bearing housing and the exhaust inlet wall are thermally deformed due to the heat of the exhaust gas, the disc spring has elastic force, and therefore, the disc spring can follow the thermal deformation.

In addition, the turbocharger of a third aspect of the invention employs a configuration wherein the outer circumferential edge of the disc spring has a curved section that curves in a direction away from the exhaust inlet wall.

In the third aspect of the invention employing the above described configuration, since the outer circumferential edge has the curved section, the curved section can be formed to evenly contact the exhaust inlet wall in the circumferential direction of the disc spring, and the exhaust gas from the contact section can be reliably prevented from leaking.

In addition, the turbocharger of a fourth aspect of the invention employs a configuration wherein a shield plate that is a ring-shaped plate is disposed at the turbine impeller side of the bearing housing, and the disc spring is disposed between the shield plate and the bearing housing.

In the fourth aspect of the invention employing the above described configuration, since the shield plate can prevent the heat of the exhaust gas introduced into the location of the turbine impeller from passing to the disc spring, the disc spring can be prevented from being thermally-deteriorated.

In addition, the turbocharger of a fifth aspect of the invention employs a configuration wherein a projecting section projecting from a surface of the bearing housing facing the turbine impeller to the turbine impeller is fitted to the inner circumferential edge of the shield plate, and the shield plate and the bearing housing pinch the inner circumferential edge of the disc spring.

In the fifth aspect of the invention employing the above described configuration, since the shield plate and the bearing housing pinch the inner circumferential edge of the disc spring, the exhaust gas can be reliably prevented from leaking from the pinched portion.

Advantageous Effects of Invention

Effects obtained according to the invention are described below.

According to the invention, since the exhaust gas can be prevented from leaking from the gap between the nozzle ring and the bearing housing, there is an effect in that the turbine efficiency of the turbocharger can be improved.

DESCRIPTION OF EMBODIMENTS

Hereinafter, a turbocharger according to an embodiment of the invention will be described with reference to the drawings.

Figure 1:
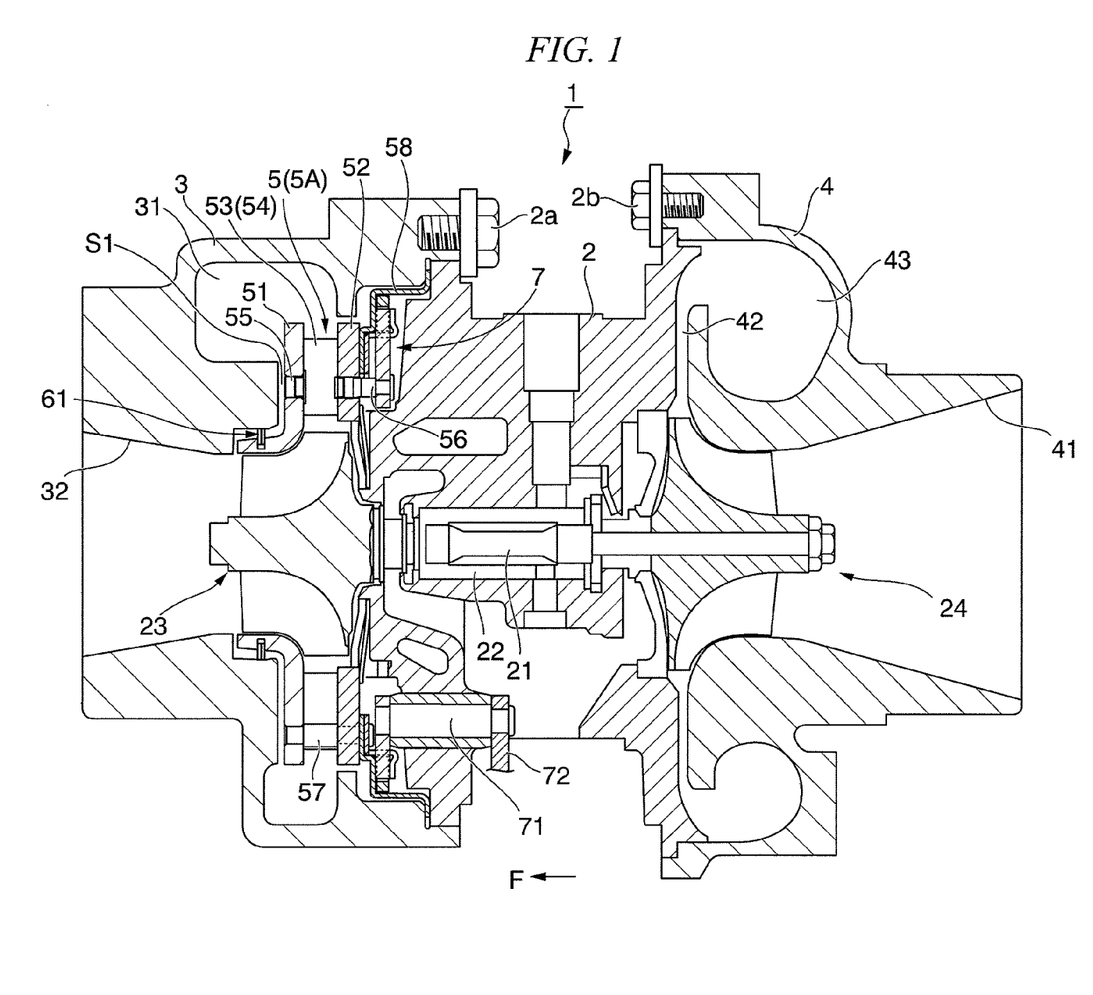
FIG. 1 is a schematic view illustrating an overall configuration of a turbocharger according to an embodiment of the invention.
Figure 2:
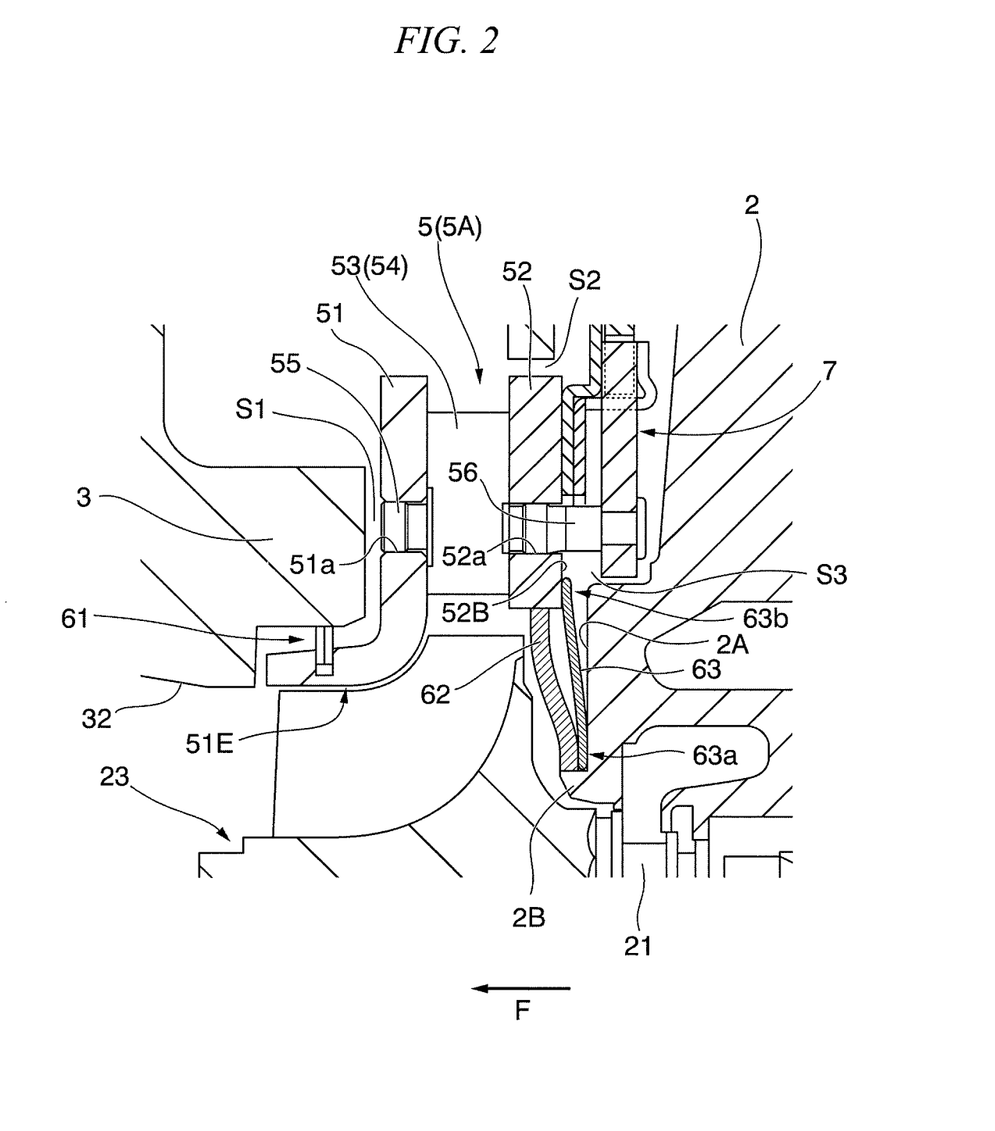
FIG. 2 is an enlarged view around a variable nozzle unit in FIG. 1.
Figure 3:
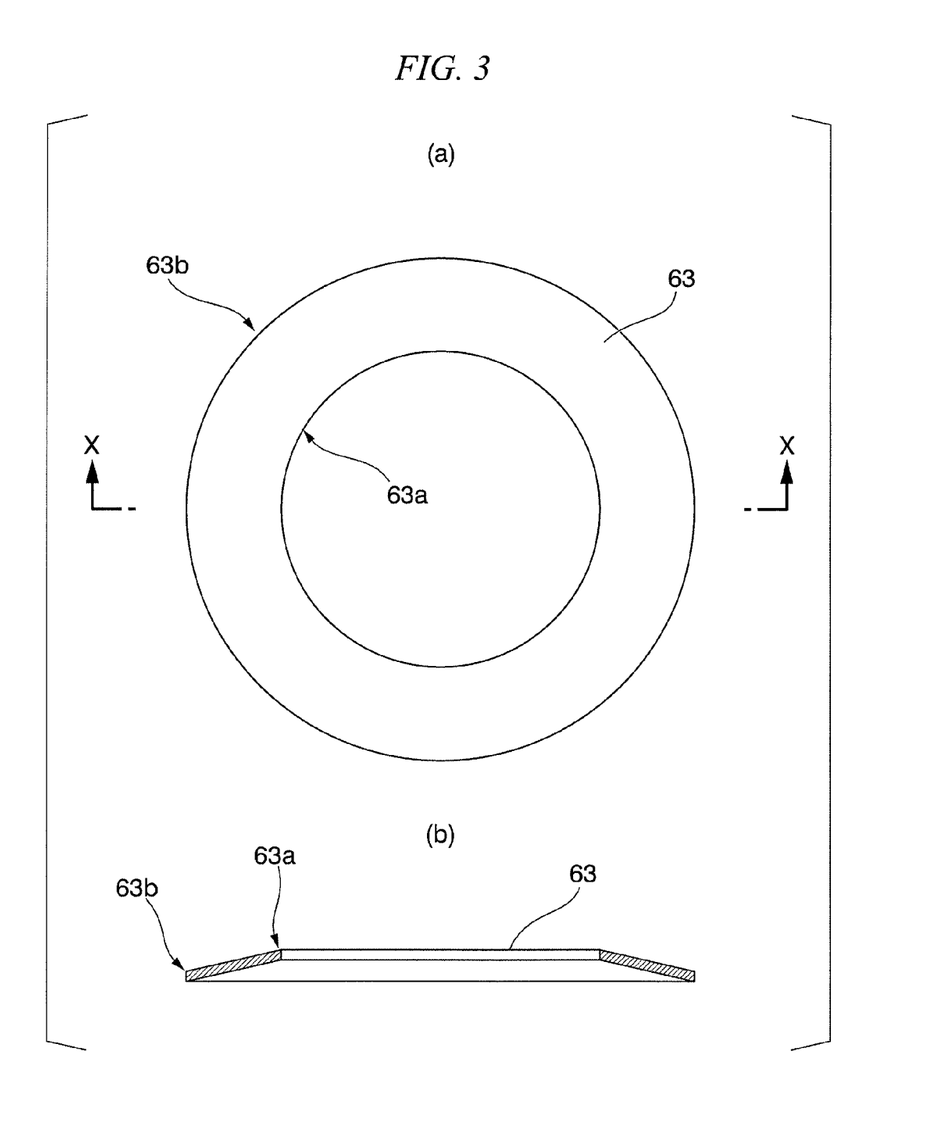
FIG. 3 is a schematic view of a disc spring of the embodiment.

FIG. 1 is a schematic view illustrating an overall configuration of a turbocharger 1 of the embodiment, FIG. 2 is an enlarged view around a variable nozzle unit 5 in FIG. 1, FIG. 3 is a schematic view of a disc spring 63 in the embodiment, (a) of FIG. 3 is a plan view of the disc spring 63 and (b) of FIG. 3 is a cross-sectional view taken along line X-X of (a) of FIG. 3. In addition, an arrow F in the drawings described above illustrates a forward direction.

First, the overall configuration of the turbocharger 1 of the embodiment will be described with reference to FIG. 1.

As shown in FIG. 1, the turbocharger 1 of the embodiment is a variable geometry turbocharger supercharging air, which is supplied to an engine (not shown), by using energy of exhaust gas introduced from the engine.

The turbocharger 1 includes a bearing housing 2, a turbine housing 3 that is connected to a circumferential edge of a front side of the bearing housing 2 by a fastening bolt 2a, and a compressor housing 4 that is connected to a circumferential edge of the rear side of the bearing housing 2 by a fastening bolt 2b.

A turbine shaft 21 extending in the front and rear direction is rotatably supported inside the bearing housing 2 via a bearing 22. A turbine impeller 23 is integrally connected to a front end of the turbine shaft 21 and a compressor impeller 24 is integrally connected to a rear end thereof. In addition, the turbine impeller 23 is disposed inside the turbine housing 3 and the compressor impeller 24 is disposed inside the compressor housing 4.

A substantially annular variable nozzle unit (an exhaust nozzle) 5 is disposed inside the turbine housing 3 and outside the turbine impeller 23 in the radial direction.

The turbine housing 3 has a turbine scroll flow path 31 that is disposed outside the turbine impeller 23 in the radial direction and a turbine housing outlet port 32 that is an exhaust port of the exhaust gas.

The turbine scroll flow path 31 is formed substantially annularly to surround the turbine impeller 23 and communicates with a gas inlet port (not shown) for introducing the exhaust gas. In addition, the turbine scroll flow path 31 communicates with a nozzle flow path 5A (described below) inside the variable nozzle unit 5. In addition, the above described gas inlet port is connected to an exhaust port of the engine (not shown).

The turbine housing outlet port 32 is opened to the front side of the turbine housing 3 and communicates with the nozzle flow path 5A via a location of the turbine impeller 23. In addition, the turbine housing outlet port 32 is connected to an exhaust gas purifier (not shown).

An intake port 41 connected to an air cleaner (not shown) that is opened to the rear side is formed at the compressor housing 4. In addition, a diffuser flow path 42, which compresses and then boosts the air, is formed substantially annularly at the outside the compressor impeller 24 in the radial direction between the bearing housing 2 and the compressor housing 4. In addition, the diffuser flow path 42 communicates with the intake port 41 via location of the compressor impeller 24.

Furthermore, the compressor housing 4 has a compressor scroll flow path 43 formed substantially annularly at outside the compressor impeller 24 in the radial direction and the compressor scroll flow path 43 communicates with the diffuser flow path 42. In addition, the compressor scroll flow path 43 communicates with an inlet port in the engine (not shown).

Next, a configuration of the variable nozzle unit 5 will be described with reference to FIGS. 1 to 3. As shown in FIG. 2, the variable nozzle unit 5 has a shroud ring 51 disposed at the turbine housing 3 side of the variable nozzle unit 5, a nozzle ring (an exhaust inlet wall) 52 facing the shroud ring 51 and disposed at the bearing housing 2 side of the variable nozzle unit 5, and a plurality of nozzle vanes 53 held between the shroud ring 51 and the nozzle ring 52.

In addition, the nozzle flow path 5A is formed between the shroud ring 51 and the nozzle ring 52.

The shroud ring 51 exhibits a shape where a substantially cylindrical extension section 51E extending to the turbine housing outlet port 32 is connected to an inner circumferential edge of a plate-shaped member formed in a substantially ring shape. In addition, a plurality of first hole sections 51a, which penetrates the plate-shaped member in the thickness direction are formed at the shroud ring 51.

The nozzle ring 52 is a plate-shaped member formed in a substantially ring shape and a plurality of second hole sections 52a, which penetrate in the thickness direction thereof are formed at the nozzle ring 52.

As shown in FIG. 1, the shroud ring 51 and the nozzle ring 52 are connected to form a predetermined gap via a plurality of the connection pins 57. In addition, the connection pins 57 intrude into the shroud ring 51, penetrate the nozzle ring 52 and then project to the rear side.

A mounting ring 58 is integrally disposed at the rear side of the nozzle ring 52 via connection pins 57 and an outer circumferential edge of the mounting ring 58 is supported and pinched by the turbine housing 3 and the bearing housing 2. In other words, the nozzle ring 52 is supported by the bearing housing 2 and the turbine housing 3 via the mounting ring 58.

A plurality of nozzle vanes 53 is disposed at regular intervals in the circumferential direction between the nozzle ring 52 and the shroud ring 51 and freely rotate about an axis parallel to a rotation shaft of the turbine impeller 23 respectively.

Each of the nozzle vanes 53 has a nozzle vane main body 54 that is a plate-shaped member that is substantially rectangular, a first vane shaft 55 projecting from a first side of the nozzle vane main body 54, and a second vane shaft 56 projecting from a second side facing the first side thereof.

The first vane shaft 55 rotatably intrudes into the first hole sections 51a of the shroud ring 51 and the second vane shaft 56 rotatably intrudes into the second hole sections 52a of the nozzle ring 52 and projects to the rear side of the nozzle ring 52.

As shown in FIG. 2, a gap S1 is formed between the shroud ring 51 and the turbine housing 3 so as to compensate for a relative displacement with respect to the shroud ring 51 in a case where the turbine housing 3 is subject to thermal deformation. Thus, in order to prevent leakage of the exhaust gas from the gap S1, two sheets of C-ring 61 are disposed between an outer circumferential surface of the extension section 51E and an inner circumferential surface of the turbine housing 3 in the shroud ring 51 in order to seal the gap S1.

In addition, a second gap S2 is formed between the nozzle ring 52 and the turbine housing 3 so as to compensate for a relative displacement with respect to the nozzle ring 52 in a case where the turbine housing 3 causes the thermal deformation. Furthermore, a third gap S3 is formed between the nozzle ring 52 and the bearing housing 2. The third gap S3 communicates with the second gap S2 and communicates with and is opened to the location of the turbine impeller 23.

A shield plate 62 is disposed between the bearing housing 2 and the turbine impeller 23 such that the heat of the exhaust gas introduced into the location of the turbine impeller 23 is prevented from passing to the bearing housing 2. The shield plate 62 is a plate-shaped member exhibiting a ring shape surrounding the turbine shaft 21. A projecting section 2B, which projects from a facing surface 2A of the bearing housing 2 facing the turbine impeller 23 to the front side thereof, is fitted to an inner circumferential edge of the shield plate 62, and an outer circumferential edge of the shield plate 62 is contacted with the inner circumference surface of the nozzle ring 52.

A disc spring (a seal member) 63 is disposed at the rear side of the shield plate 62, in other words, at an opening with respect to the location of the turbine impeller 23 in the third gap S3. As shown in FIG. 3, the disc spring 63 is a plate-shaped member formed in a ring shape, an inner circumferential edge 63a and an outer circumferential edge 63b of the disc spring 63 are shifted with respect to the center axis direction of the disc spring 63, and the disc spring 63 is a spring member having an elastic force in the center axis direction.

As shown in FIG. 2, the projecting section 2B of the bearing housing 2 penetrates the center opening of the disc spring 63 and the inner circumferential edge 63a of the disc spring 63 is pinched by the shield plate 62 and the facing surface 2A of the bearing housing 2 without a gap. Meanwhile, the outer circumferential edge 63b of the disc spring 63 contacts a second facing surface 52B of the nozzle ring 52 facing the bearing housing 2 without a gap.

Here, the disc spring 63 is disposed between the nozzle ring 52 and the bearing housing 2 in a state compressed from a natural length thereof (a length in which no load is placed) so that an inner circumferential edge 63a of the disc spring 63 firmly contacts the facing surface 2A of the bearing housing 2 and the outer circumferential edge 63b of the disc spring 63 firmly contacts the second facing surface 52B of the nozzle ring 52.

Next, a configuration of a synchronization mechanism 7 will be described with reference to FIG. 1, which rotates in synchronization each of the nozzle vanes 53 in the embodiment.

As shown in FIG. 1, the synchronization mechanism 7 is disposed at the rear side of the variable nozzle unit 5 to rotate in synchronization each of the nozzle vanes 53.

The synchronization mechanism 7 exhibits an annular shape to surround the turbine impeller 23 and connected to the second vane shaft 56 of the nozzle vanes 53 respectively. In addition, the synchronization mechanism 7 is connected to an actuator such as a cylinder (not shown) to operate the synchronization mechanism 7 via a driving shaft 71 and a driving lever 72.

Subsequently, the operation of the turbocharger 1 of the embodiment will be described.

First, the operation, which supercharges the air supplied to the engine using the energy of the exhaust gas of the turbocharger 1 will be described.

The exhaust gas discharged from an exhaust port of the engine is introduced into the turbine scroll flow path 31 through the gas inlet port of the turbine housing 3. Subsequently, the exhaust gas is introduced from the turbine scroll flow path 31 into the nozzle flow path 5A.

At this time, each of the nozzle vanes 53 is rotated by the operation of the actuator (not shown) and the synchronization mechanism 7 according to the number of revolutions of the engine, in other words, the flow rate of the exhaust gas introduced into the nozzle flow path 5A, and the opening area of the nozzle flow path 5A is changed. The flow rate of the exhaust gas passing through the nozzle flow path 5A is adjusted by the change of the opening area and as a result, the performance of the engine can be improved over a wide range from a low revolution region to a high revolution region. The exhaust gas passing through the nozzle flow path 5A is introduced into the location of the turbine impeller 23 and rotates the turbine impeller 23. After that, the exhaust gas is discharged from the turbine housing outlet port 32.

Since the turbine impeller 23 is connected to the compressor impeller 24 via the turbine shaft 21, the compressor impeller 24 rotates when the turbine impeller 23 rotates.

The air introduced from the intake port 41 is supplied to the diffuser flow path 42 by the rotation of the compressor impeller 24. The air is compressed and boosted by passing through the diffuser flow path 42. The boosted air passes through the compressor scroll flow path 43 and is supplied to the intake port of the engine. As a result, the air is supercharged to the engine and the output of the engine can be improved.

As described above, the supercharging operation of the turbocharger 1 finishes.

Next, an operation, where the disc spring 63 shields the opening with respect to the location of the turbine impeller 23 in the third gap S3, will be described.

Since the second gap S2 communicates with the turbine scroll flow path 31 and the third gap S3 communicates with the second gap S2, the exhaust gas is introduced from the turbine scroll flow path 31 into the third gap S3 via second gap S2.

Here, the disc spring 63 is disposed between the nozzle ring 52 and the bearing housing 2 such that the disc spring 63 shields the opening with respect to the location of the turbine impeller 23 in the third gap S3.

Accordingly, the disc spring 63 prevents the exhaust gas introduced into the third gap S3 from leaking to the location of the turbine impeller 23. As a result, the flow of the exhaust gas introduced into the location of the turbine impeller 23 via the variable nozzle unit 5 can be kept in a uniform state without disturbing the flow thereof.

In addition, even though the nozzle ring 52 and the bearing housing 2 causes thermal deformation due to the heat of the exhaust gas, the disc spring 63 has elastic force such that the disc spring 63 can follow the thermal deformation.

In addition, since the shield plate 62 prevents the heat of the exhaust gas introduced into the location of the turbine impeller 23 from passing to the disc spring 63, the shield plate 62 can prevent the disc spring 63 from losing the elastic force due to the heat (thermal degradation).

Thus, the following effects can be obtained according to the embodiment. In the embodiment, since the exhaust gas can be prevented from leaking from the gap between the nozzle ring 52 and the bearing housing 2, there is an effect in that the turbine efficiency of the turbocharger 1 can be improved.

In addition, the operation procedures, the shape or the assembly of each of the configurations, or the like in the above described embodiment, is an example and various changes are possible based on the process condition, the design requirement or the like without departing from the scope of the invention.

For example, in the above described embodiment, the disc spring 63 is employed as the seal member which seals the gap between the nozzle ring 52 and the bearing housing 2, however, the seal member may be a member which has the elastic force in the front and rear direction, and for example, may also be a substantially cylindrical bellows member which expands and contracts in the front and rear direction.

Figure 4:
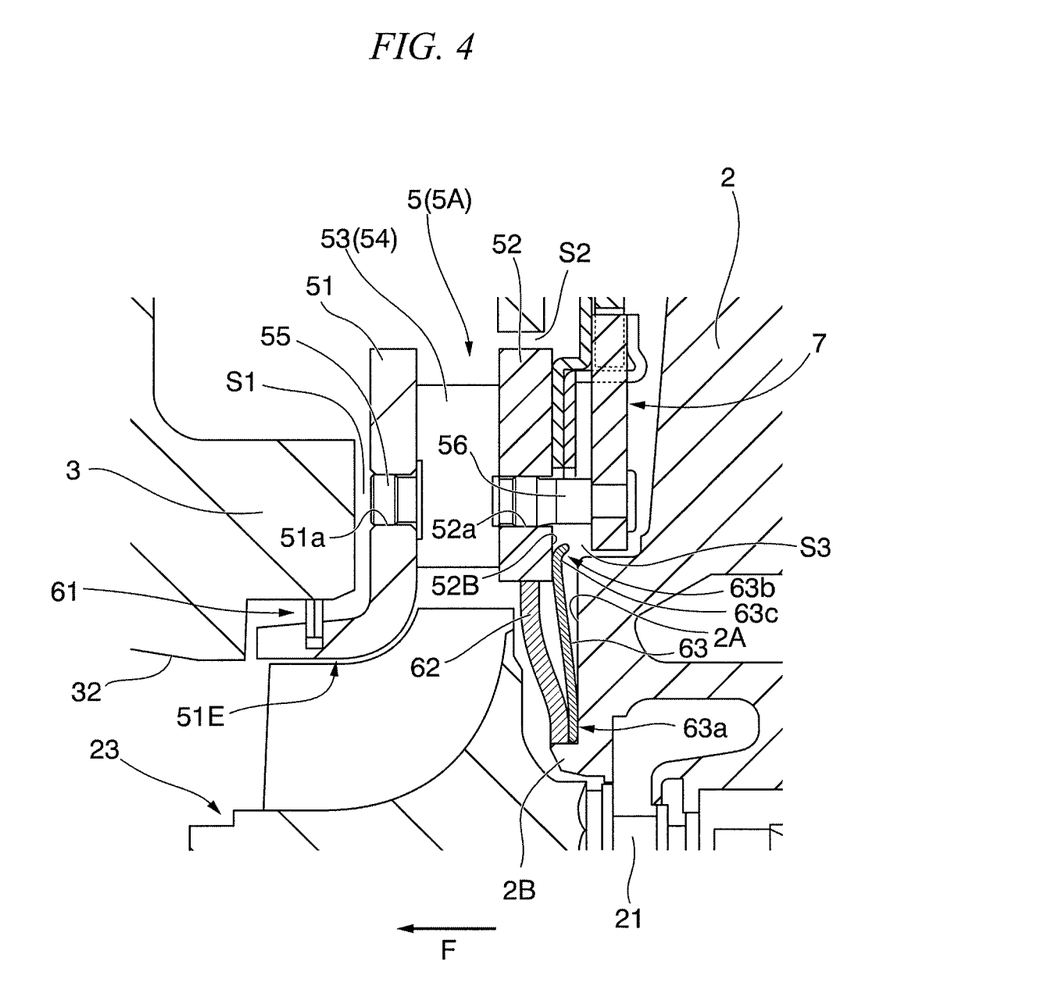
FIG. 4 is a schematic view illustrating another configuration of the disc spring.

In addition, in the above described embodiment, the outer circumferential edge 63b of the disc spring 63 firmly contacts the second facing surface 52B of the nozzle ring 52 at the edge thereof, however, as shown in FIG. 4, the outer circumferential edge 63b may have a curved section 63c that curves in a direction away from the nozzle ring 52.

FIG. 4 is a schematic view illustrating another configuration of the disc spring 63.

When employing the configuration, since the curved section 63c can be formed to evenly contact the second facing surface 52B of the nozzle ring 52 in the circumferential direction of the disc spring 63, the exhaust gas from the contact section can be reliably prevented from leaking.

INDUSTRIAL APPLICABILITY

According to the invention, since the exhaust gas can be prevented from leaking from the gap between the nozzle ring and the bearing housing, the turbine efficiency of the turbocharger can be improved.

REFERENCE SIGNS LIST

1 . . . turbocharger
2 . . . bearing housing
2A . . . facing surface
2B . . . projecting section
5 . . . variable nozzle unit (exhaust nozzle)
23 . . . turbine impeller
52 . . . nozzle ring (exhaust inlet wall)
62 . . . shield plate
63 . . . disc spring (seal member)
63a . . . inner circumferential edge
63b . . . outer circumferential edge
63c . . . curved section

The invention claimed is:

1. A variable geometry turbocharger comprising:
a bearing housing rotatably supporting a turbine impeller; and
an exhaust nozzle that can change the flow rate of an exhaust gas supplied to the turbine impeller,
wherein the exhaust nozzle has an exhaust inlet wall disposed at the bearing housing side of the exhaust nozzle,
the turbocharger has a seal member exhibiting a ring shape and sealing a gap formed between the bearing housing and the exhaust inlet wall,
an inner circumferential edge of the seal member firmly contacts the bearing housing and an outer circumferential edge of the seal member firmly contacts the exhaust inlet wall,
the seal member is a disc spring,
a shield plate that is a ring-shaped plate is disposed at the turbine impeller side of the bearing housing, and the disc spring is disposed between the shield plate and the bearing housing,
the outer circumferential edge of the seal member has a curved section that curves in a direction away from the exhaust inlet wall, and
a projecting section projecting from a surface of the bearing housing facing the turbine impeller to the turbine impeller is fitted to an inner circumferential edge of the shield plate, and the shield plate and the bearing housing pinch the inner circumferential edge of the seal member.

2. A variable geometry turbocharger comprising:
a bearing housing rotatably supporting a turbine impeller; and
an exhaust nozzle that can change the flow rate of an exhaust gas supplied to the turbine impeller,
wherein the exhaust nozzle has an exhaust inlet wall disposed at the bearing housing side of the exhaust nozzle,
the turbocharger has a seal member exhibiting a ring shape and sealing a gap formed between the bearing housing and the exhaust inlet wall, an inner circumferential edge of the seal member firmly contacts the bearing housing and an outer circumferential edge of the seal member firmly contacts the exhaust inlet wall, the seal member is a disc spring, a shield plate that is a ring-shaped plate is disposed at the turbine impeller side of the bearing housing, and the disc spring is disposed between the shield plate and the bearing housing, and a projecting section projecting from a surface of the bearing housing facing the turbine impeller to the turbine impeller is fitted to an inner circumferential edge of the shield plate, and the shield plate and the bearing housing pinch the inner circumferential edge of the seal member.

3. A variable geometry turbocharger comprising:

a turbine housing including a turbine scroll flow path;

a variable nozzle unit disposed in the turbine housing and including a nozzle ring, a first gap being formed between the turbine housing and the nozzle ring, the first gap communicating with the turbine scroll flow path;

a bearing housing disposed in the turbine housing, a second gap being formed between the nozzle ring and the bearing housing, the second gap communicating with the first gap;

a shield plate disposed in the turbine housing; and a seal member disposed at the second gap, wherein the shield plate and the bearing housing pinch an inner circumferential edge of the seal member.

4. The variable geometry turbocharger according to claim 3, wherein an outer circumferential edge of the seal member contacts a portion of the nozzle ring facing the bearing housing.

5. The variable geometry turbocharger according to claim 3, wherein an outer circumferential edge of the shield plate is contacted with the inner circumference surface of the nozzle ring.

6. The variable geometry turbocharger according to claim 3, further comprising a projecting section configured to project from a surface of the bearing housing that faces a turbine impeller in the turbine housing, wherein the projection section is fitted to an inner circumferential edge of the shield plate.

7. The variable geometry turbocharger according to claim 3, wherein the seal member is a disc spring.

8. The variable geometry turbocharger according to claim 7, wherein an outer circumferential edge of the disc spring includes a curved section that curves in a direction away from the nozzle ring.

* * * * *